United States Patent [19]
Watanabe

[11] Patent Number: 5,640,450
[45] Date of Patent: Jun. 17, 1997

[54] SPEECH CIRCUIT CONTROLLING SIDETONE SIGNAL BY BACKGROUND NOISE LEVEL

[75] Inventor: Osamu Watanabe, Sendai, Japan

[73] Assignee: Kokusai Electric Co., Ltd., Tokyo, Japan

[21] Appl. No.: 492,753

[22] Filed: Jun. 21, 1995

[30] Foreign Application Priority Data

Jul. 8, 1994 [JP] Japan .................................. 6-179805

[51] Int. Cl.$^6$ ...................................................... H04M 1/58
[52] U.S. Cl. ............................ 379/392; 379/388; 379/390; 379/391; 381/57
[58] Field of Search .......................... 379/388, 389, 379/390, 391, 392, 409, 420; 381/57, 94, 104, 107, 108

[56] References Cited

U.S. PATENT DOCUMENTS

| | | |
|---|---|---|
| 4,513,177 | 4/1985 | Nishino et al. ....................... 379/389 |
| 4,829,565 | 5/1989 | Goldberg ............................... 379/390 |
| 4,847,897 | 7/1989 | Means .................................... 379/390 |
| 4,891,837 | 1/1990 | Walker et al. ......................... 379/390 |
| 4,908,855 | 3/1990 | Ohga et al. ........................ 379/390 X |
| 5,202,918 | 4/1993 | White .................................... 379/390 |
| 5,243,657 | 9/1993 | Cotton .................................... 381/57 |
| 5,297,198 | 3/1994 | Butani et al. ......................... 379/389 |
| 5,386,465 | 1/1995 | Addeo et al. ..................... 379/392 X |
| 5,526,419 | 6/1996 | Allen et al. ....................... 379/390 X |

*Primary Examiner*—Krista M. Zele
*Assistant Examiner*—Devendra Kumar
*Attorney, Agent, or Firm*—Emmanuel J. Lobato; Burns & Lobato, P.C.

[57] ABSTRACT

A speech circuit is disclosed which solves the serious problem of the degradation of the articulation of received speech voice in conventional circuits and permits pleasant communications at places where the background noise level is high. The circuit has a construction in which an input signal from a microphone is attenuated in correspondence to the background noise level to form a sidetone signal and a received speech signal from a speech channel is amplified in correspondence to the background noise level to form a new received speech signal.

3 Claims, 2 Drawing Sheets

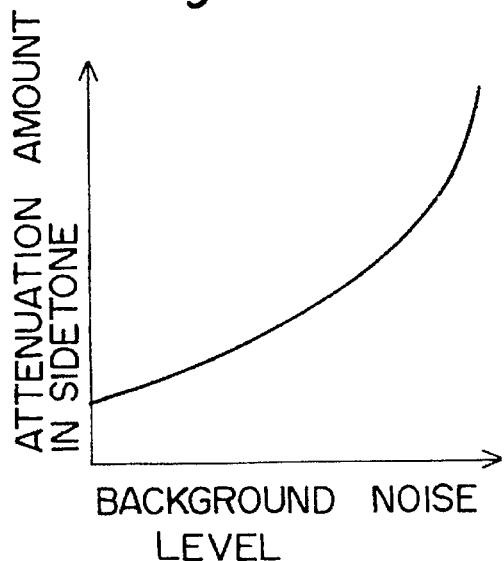
Fig. 2A
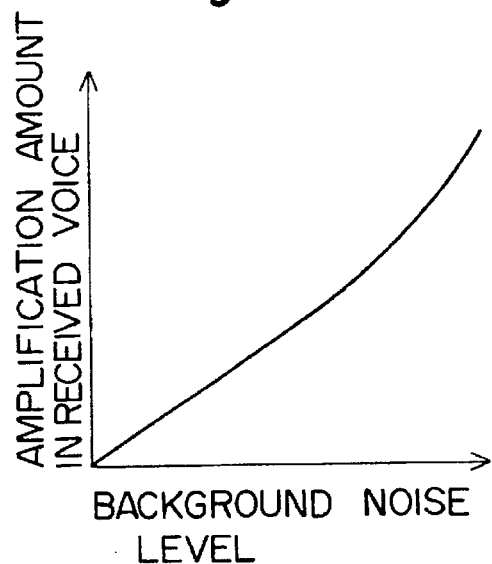
Fig. 2B
Fig. 3 PRIOR ART
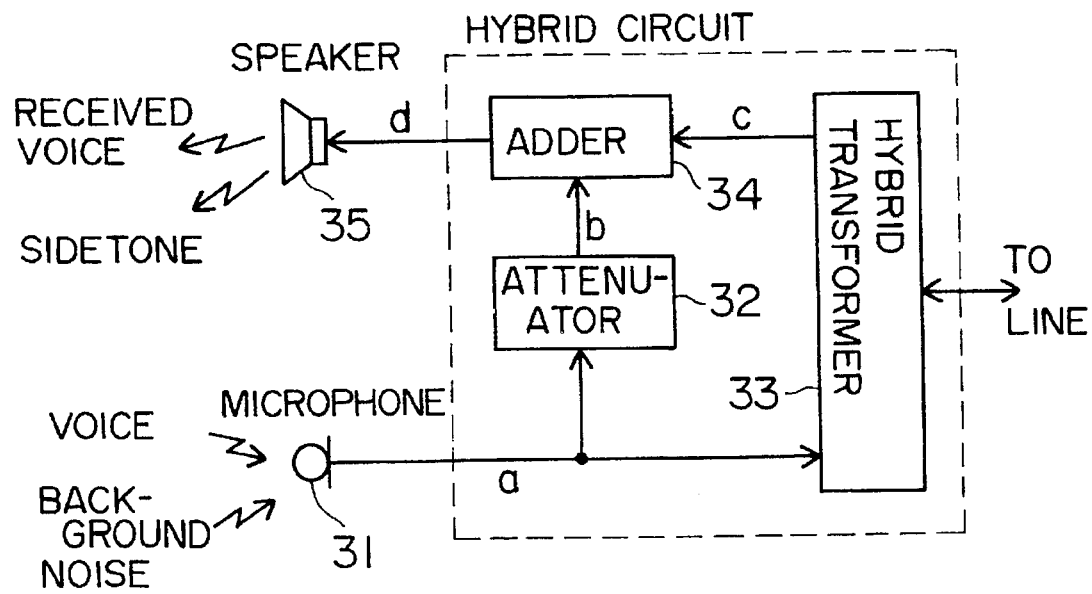

SPEECH CIRCUIT CONTROLLING SIDETONE SIGNAL BY BACKGROUND NOISE LEVEL

BACKGROUND OF THE INVENTION

The present invention relates to a speech circuit which controls sidetones and received speech sounds in a communication equipment, a telephone set and the like.

In a speech circuit of a voice communication equipment, by providing certain attenuation to an input signal from a microphone and feeding it back to a speaker of the same speech circuit (which fed-back signal is commonly referred to as a sidetone), a talker is allowed to listen to the vocal sounds uttered by himself and hence continue conversation with ease. FIG. 3 is a block diagram showing an example of a conventional sidetone control circuit. Conventionally, the sidetone is controlled by a hybrid circuit surrounded by the broken lines. Next, the flow of a signal will be described for each functional block. An input signal a to a microphone 31 is provided onto a circuit via a hybrid transformer 33. On the other hand, a sidetone signal b is attenuated by an attenuator 32 as predetermined and then input into an adder 34. The adder 34 is simultaneously supplied with a received signal c from a communication line via the hybrid transducer 33; the adder 34 adds together these two signals and outputs a signal d. The output signal d is radiated out by a speaker 35 into space.

With such a receiving sidetone control circuit, the input signal a is always attenuated as predetermined and turned into the sidetone signal b, which is added by the adder 34 to the received signal c to form the output signal d. This operation is carried out regardless of the level of background noise.

Hence, when the background noise at the talker side, which is input into the microphone 31, is high in level, a sidetone signal (noise) of a large level proportional to the background noise is superimposed on the other party's voice or sound which is the received signal c. This degrades the articulation or clarity of the received speech voice. Moreover, since the received signal c is output at a fixed level independently of the background noise level at the talker side, the received speech sound radiated out from the speaker 35 is readily masked with background noise. This leads to the degradation of the articulation or clarity of conversations. Such a serious problem as the degradation of articulation frequently arises in telephone conversations at places where the background noise level is very high, for example, at public telephone sets installed in the Japanese super express trains.

SUMMARY OF THE INVENTION

An object of the present invention is to provide a speech circuit which solves the serious problem of the degradation of the articulation of received speech voice in the conventional circuit and permits pleasant communications at places where the background noise level is high.

To attain the above object, the speech circuit according to the present invention has a construction in which the input signal from the microphone is attenuated in correspondence to the background noise level to form a sidetone signal so that the received speech signal from the circuit is attenuated in correspondence to the background noise level to form a new received speech signal.

BRIEF DESCRIPTION OF THE DRAWINGS

The present invention will be described in detail below with reference to accompanying drawings, in which:

FIG. 2A and 2B show characteristic diagrams illustrating the relationships of the background noise level to the amounts of attenuation and amplification in the circuit of the present invention; and FIG. 3 is a functional block diagram of a conventional speech circuit.

PREFERRED EMBODIMENT OF THE INVENTION

Figure 1:
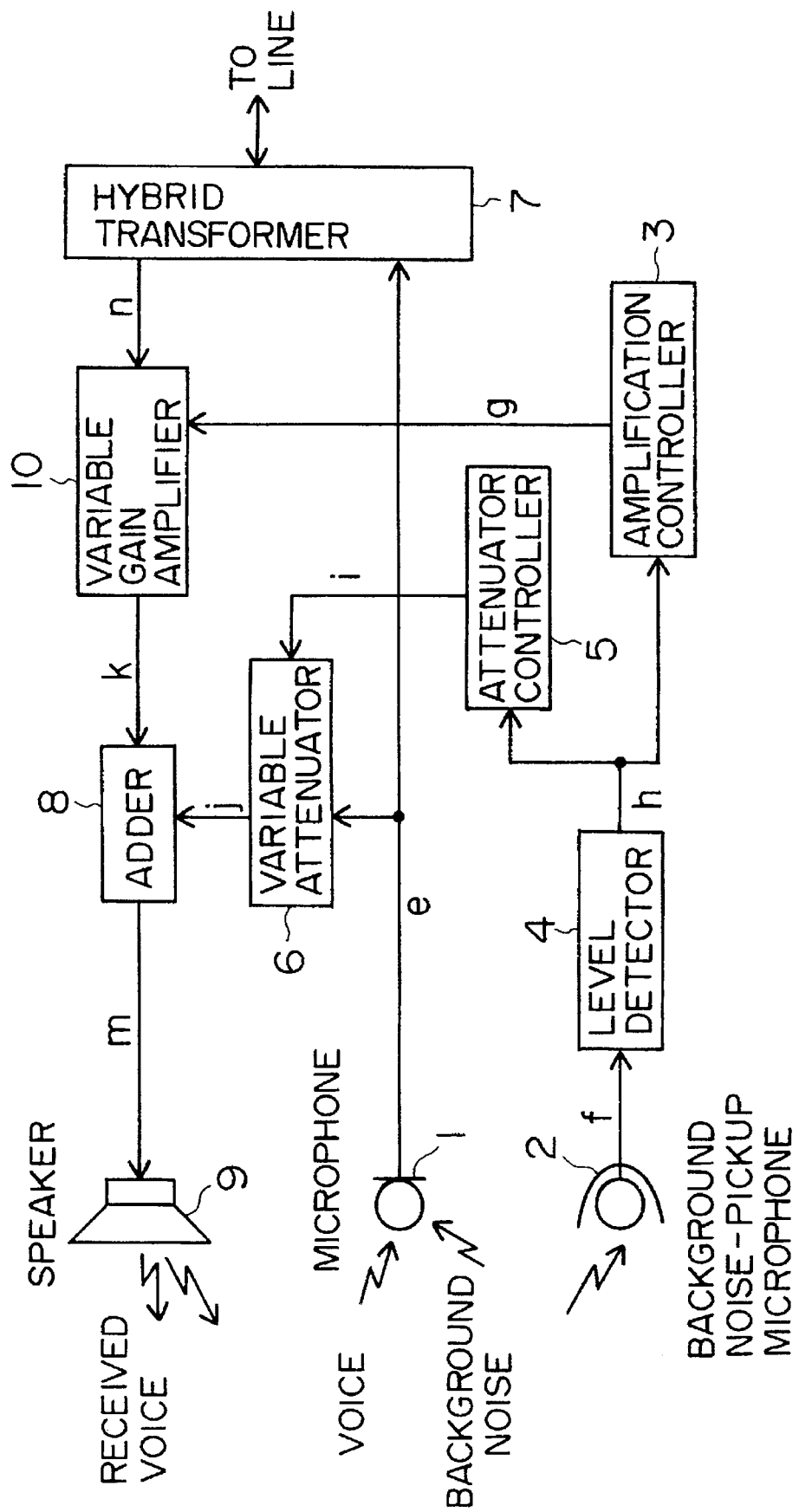
FIG. 1 is a functional block diagram of a speech circuit according to the present invention.

FIG. 1 is a block diagram illustrating an embodiment of the present invention. Next, the structure and operation of this embodiment will be described.

A signal e input from a microphone 1 is fed to a variable attenuator 6, while at the same time it is also applied to a hybrid transformer 7 for the provision therefrom onto the communication line. Moreover, a received speech sound n from the other party is input into a variable amplifier 10 via the hybrid transformer 7. On the other hand, a background noise f in the talker's voice, which is input into the microphone 1, is picked up by a background noise pickup microphone 2 mounted on the back of the telephone set or attached in the receiver and is input into a level detector 4. Incidentally, the background noise pickup microphone 2 may also be oriented in a direction of the minimum sensitivity to the talker's voice. The level detector 4 calculates a long-term level average of the background noise f and provides the average level value to an attenuation controller 5 and an amplification controller 3.

The attenuation controller 5 produces an attenuation control signal i which causes a decrease or increase in the amount of attenuation, depending upon whether the background noise level is low or high, as depicted in FIG. 2A. The variable attenuator 6 responds to the attenuation control signal i to provide a required attenuation to the input signal e and outputs the attenuated signal as a sidetone signal j. The variable attenuator 6 is now in use as an electronic continuous-variable attenuator; it is also called a programmable attenuator. For example, some of such variable attenuators linearly attenuate input control voltages of 0 to 10 V over 0 to 4 dB, or vary the amount of attenuation over 0 to 65 dB in 1-dB step in accordance with input control digital data.

The amplification controller 3 generates, as shown in FIG. 2B, an amplification control signal g which causes a decrease or increase in the amount of amplification, depending upon whether the background noise level is low or high. The variable gain amplifier 10 responds to the amplification control signal g to amplify the received speech signal n as required and outputs the amplified signal as a controlled received speech signal k. An adder 8 is supplied with the received speech signal k and the sidetone signal j and adds them together to form an output signal m, which is radiated out from a speaker 9 into space.

With the speech circuit of the present invention which is equipped with control functions for the sidetone and received speech signal as described above, the input signal e from the microphone is attenuated in correspondence to the background noise level to form the sidetone signal j and the received speech signal n is also amplified in correspondence to the background noise level to form the new received speech signal k. Thus, even when the level of the background noise picked up by the background noise pickup microphone 2 is high, the superimposition of the sidetone signal j on the other party's voice, i.e. the received speech signal k, would not severely deteriorate the articulation or clarity of the latter, because the sidetone signal has been sufficiently attenuated. Furthermore, the received speech signal k itself is an amplified version of the signal n when the background noise level is high; hence, there is no possibility that the received speech sound radiated out from the speaker 9 is masked by the background noise which would lead to the deterioration of its articulation.

As described in detail above, according to the present invention, a sidetone signal of a level corresponding to the background noise level at the talker side can be produced, and hence it would not severely impair the articulation or clarity of the other party's voice even if superimposed thereon.

What I claim is:

1. A speech circuit, in which a received speech signal is added by an adder with a sidetone signal produced by attenuating a speech signal of a talker from a first microphone of said speech circuit so that a speech output from said talker is heard at the output from a speaker therein, said speech circuit comprising:

an auxiliary microphone other than said first microphone for picking up background noise;

a level detector for receiving background noise from said auxiliary microphone and detecting the background noise level;

an attenuator controller for outputting an attenuation control signal effective to decrease or increase the amount of attenuation in dependence upon whether said background noise level from said level detector is high or low; and a variable attenuator for receiving said speech signal from said first microphone and attenuating only said speech signal in accordance with said attenuation control signal to produce said sidetone signal.

2. A speech circuit, in which a received speech signal is added by an adder with a sidetone signal produced by attenuating a speech signal of a talker from a first microphone therein so that a speech output from said talker is heard at the output from a speaker, said speech circuit comprising:

an auxiliary microphone other than said first microphone for picking up background noise;

a level detector for receiving background noise from said auxiliary microphone and detecting the background noise level;

an attenuation controller for outputting an attenuation control signal effective to decrease or increase the amount of attenuation, depending upon whether said background noise level provided form said level detector is low or high;

a variable attenuator for receiving said speech signal from said first microphone and attenuating only said speech signal in accordance with said attenuation control signal to produce said sidetone signal;

an amplification controller for outputting an amplification control signal which causes a decrease or increase in the amount of amplification of said received speech signal, depending upon whether said background noise level provided from said level detector is low or high; and a variable amplifier for receiving said received speech signal and for amplifying said received speech signal in accordance with said amplification control signal.

3. A speech circuit according to claim 2, in which said auxiliary microphone is oriented in a direction of the minimum sensitivity to vocal sounds heard from said talker.

* * * * *